(12) United States Patent
Bassett (10) Patent No.: US 8,869,938 B2
(45) Date of Patent: Oct. 28, 2014

(54) TREE-MOUNTED HUNTING STAND WITH MODULAR FUNCTIONALITY

(71) Applicant: Irwin Jay Bassett, Pierson, MI (US)

(72) Inventor: Irwin Jay Bassett, Pierson, MI (US)

( * ) Notice: Subject to any disclaimer, the term of this patent is extended or adjusted under 35 U.S.C. 154(b) by 0 days.

(21) Appl. No.: 13/678,480

(22) Filed: Nov. 15, 2012

(65) Prior Publication Data

US 2014/0131137 A1    May 15, 2014

(51) Int. Cl.
*A01M 31/02* (2006.01)

(52) U.S. Cl.
CPC ..................................... *A01M 31/02* (2013.01)
USPC ............ 182/187; 182/115; 182/120; 182/129

(58) Field of Classification Search
USPC ......... 182/120, 121, 129, 187, 188, 115, 116, 182/59, 83–86; 248/210, 211, 238
See application file for complete search history.

(56) References Cited

U.S. PATENT DOCUMENTS

| | | | | | |
|---|---|---|---|---|---|
| 2,020,774 | A | * | 11/1935 | Filipich | 182/58 |
| 2,802,702 | A | * | 8/1957 | Rose | 182/121 |
| 3,719,252 | A | * | 3/1973 | Tiley | 182/187 |
| 4,727,961 | A | | 3/1988 | Dawson | |
| 4,730,697 | A | * | 3/1988 | Campbell | 182/121 |
| 4,730,699 | A | | 3/1988 | Threlkeld | |
| 5,241,772 | A | | 9/1993 | Hall | |
| 5,371,966 | A | | 12/1994 | Hall | |
| 5,518,083 | A | * | 5/1996 | Blennert | 182/188 |
| 5,588,499 | A | | 12/1996 | Carriere | |
| 5,862,883 | A | | 1/1999 | Carriere | |
| 5,927,437 | A | | 7/1999 | Fast | |
| 6,367,585 | B1 | * | 4/2002 | Fast | 182/187 |
| 6,681,892 | B2 | * | 1/2004 | Husband | 182/93 |
| 6,848,540 | B2 | * | 2/2005 | Kvam | 182/129 |
| 6,918,465 | B2 | | 7/2005 | Eastman, II | |
| 7,021,423 | B1 | | 4/2006 | Pestrue et al. | |
| 7,281,607 | B1 | * | 10/2007 | Kiraly | 182/82 |
| D564,937 | S | | 3/2008 | Pestrue et al. | |
| 7,386,973 | B2 | * | 6/2008 | Madill, Jr. | 54/46.1 |
| 7,717,232 | B2 | | 5/2010 | Butcher | |
| 8,230,972 | B2 | * | 7/2012 | Johnson | 182/187 |
| 2002/0148685 | A1 | * | 10/2002 | Shan et al. | 182/187 |
| 2003/0196855 | A1 | * | 10/2003 | Kvam | 182/129 |
| 2004/0182803 | A1 | * | 9/2004 | Lay et al. | 211/85.11 |
| 2006/0196726 | A1 | | 9/2006 | Pestrue | |
| 2006/0207833 | A1 | * | 9/2006 | Kessinger | 182/187 |
| 2007/0256892 | A1 | * | 11/2007 | Breedlove | 182/116 |
| 2008/0156586 | A1 | | 7/2008 | Pestrue | |
| 2008/0156588 | A1 | | 7/2008 | Butcher | |
| 2009/0223742 | A1 | * | 9/2009 | LePage | 182/123 |
| 2009/0321186 | A1 | * | 12/2009 | Louchart | 182/188 |
| 2011/0297481 | A1 | | 12/2011 | Copus | |
| 2011/0308887 | A1 | * | 12/2011 | Johnson | 182/187 |
| 2012/0175190 | A1 | * | 7/2012 | Schlipf | 182/187 |

OTHER PUBLICATIONS

Bass Pro catalog, 6 pages, basspro.com.

* cited by examiner

*Primary Examiner* — Daniel Cahn
(74) *Attorney, Agent, or Firm* — McGarry Bair PC (57) ABSTRACT

A tree-mountable hunting stand having a support frame for attachment to a tree and including a horizontal support member, a hanger plate for suspended engagement with the horizontal support member, and a dual axis pivoting seat assembly attached to the hanger plate and including a saddle for supporting a hunter. The saddle includes a seat surface and a pommel extending upwardly from the seat surface. While the support frame is attached to a tree, the hanger plate can be selectively attached to and removed from the support frame to locate the dual axis pivoting seat assembly at a selected height along the support frame.

6 Claims, 9 Drawing Sheets

TREE-MOUNTED HUNTING STAND WITH MODULAR FUNCTIONALITY

BACKGROUND

Brief Description of the Invention

A tree-mountable hunting stand having a support frame for attachment to a tree and including a horizontal support member, a hanger plate for suspended engagement with the horizontal support member, and a dual axis pivoting seat assembly attached to the hanger plate and including a saddle for supporting a hunter. The saddle includes a seat surface and a pommel extending upwardly from the seat surface. While the support frame is attached to a tree, the hanger plate can be selectively attached to and removed from the support frame to locate the dual axis pivoting seat assembly at a selected height along the support frame.

DETAILED DESCRIPTION OF THE INVENTION

The invention relates to hunting stands. In one of its aspects, the invention relates to a tree-mountable hunting stand having modular functionality. For purposes of description related to the Figures, the terms "upright," "upper," "lower," "right," "left," "rear," "front," "vertical," "horizontal," and derivatives thereof shall relate to the invention as oriented from the perspective of a user with the user's back against a tree to which the hunting stand is attached as described herein. However, it is to be understood that the invention may assume various alternative orientations, except where expressly specified to the contrary. It is also to be understood that the specific devices and dynamics illustrated in the attached drawings, and described in the following specification, are merely exemplary embodiments of the inventive concepts defined in the appended claims. Hence, specific dimensions and other physical characteristics relating to the embodiments disclosed herein are not to be considered as limiting, unless the claims expressly state otherwise.

Moreover, it is to be understood that the structural elements of the invention illustrated in the attached drawings, and described in the following specification, may be fabricated of alternative materials, and no single material shall be considered as limiting, unless expressly stated otherwise. Unless otherwise expressed, any material utilized for an element of the invention is to be understood as having properties, such as strength, durability, flexibility, and the like, that are suitable for the purposes intended. Finally, "rigidly coupled," "rigidly connected,", and like terms, are to be understood as including welding, brazing, keyed coupling, and any other fastening method providing a rigid joint between two members, unless otherwise expressed.

Figure 1:
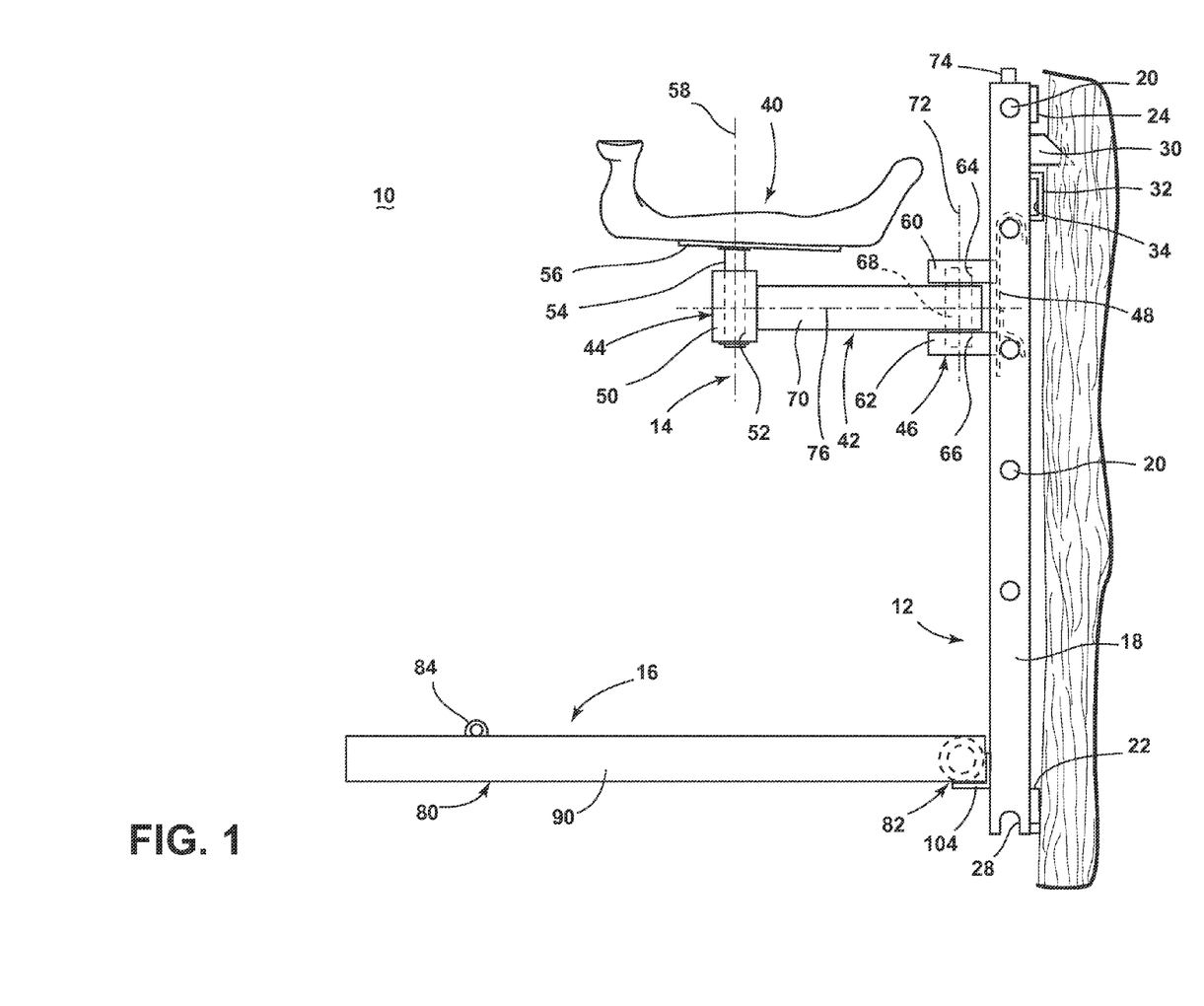
FIG. 1 is a side view of a tree-mountable hunting stand according to an embodiment of the invention, including a support frame, a first embodiment saddle assembly, and a platform assembly.

Referring to the drawings and particularly to FIG. 1, a tree-mountable hunting stand 10 can be a modular assembly that can include a support frame 12, a platform assembly 16 pivotably coupled with the support frame 12, and at least one of a hanger plate assembly and a saddle assembly 14, according to an embodiment of the invention. As will be described hereinafter, the support frame 12 can be fastened to a tree, the platform 16 can be pivoted to a horizontal orientation, and the saddle assembly 14 can be removably coupled with the support frame 12 to enable a hunter to readily configure the hunting stand 10 against or on a tree.

Figure 2:
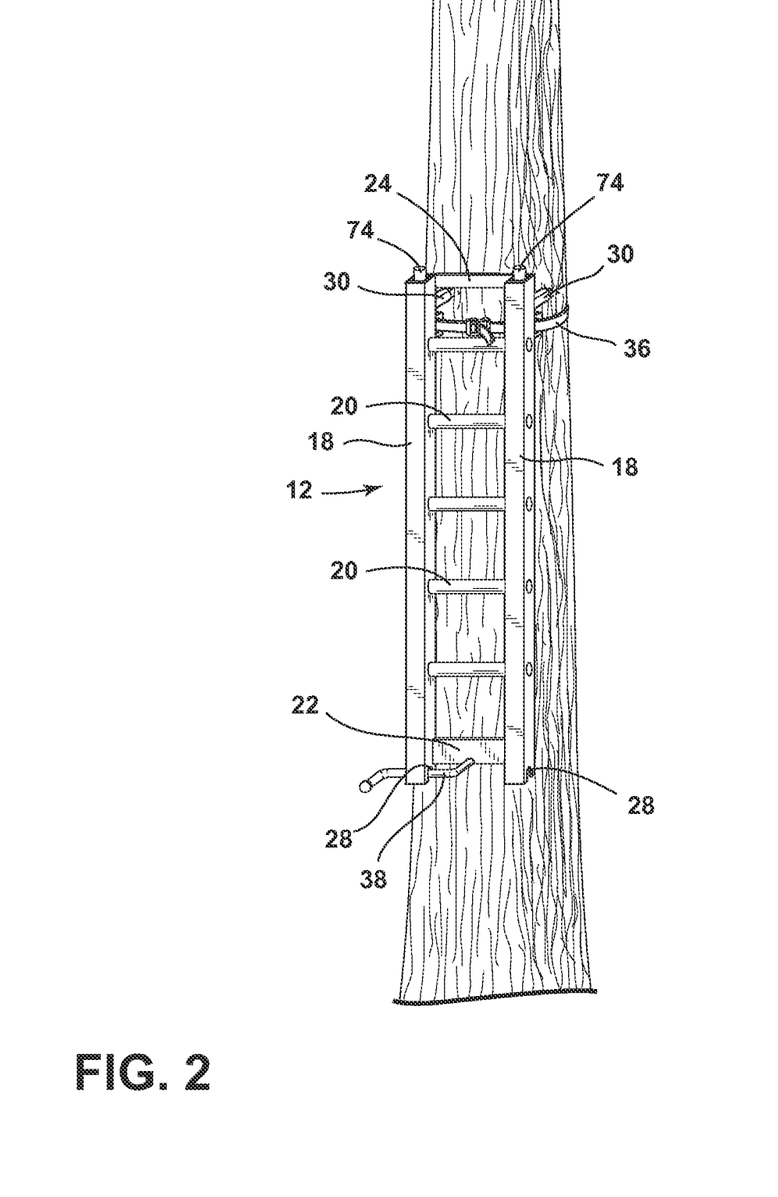
FIG. 2 is a perspective view of the support frame illustrated in FIG. 1 attached to a tree, with the saddle assembly and platform assembly removed for purposes of clarity.

Referring also to FIG. 2, the support frame 12 can be a ladder-like body having a pair of spaced parallel vertical support members, also referred to as frame rails 18, and a plurality of horizontal support members, also referred to as rungs 2, rigidly attached to and extending between the frame rails 18. The frame rails 18 can be hollow or solid elongate members. Each frame rail 18 can terminate at the top in an extension coupler 74 (illustrated as a cylindrical peg) adapted for longitudinally joining support frames 12 through seating of each extension coupler 74 in a complementary recess (not shown) in the bottom ends of an adjoining frame rail 18.

The support frame 12 can include a lower tie beam 22 and an upper tie beam 24 rigidly coupling the frame rails 18 to provide resistance to "racking" of the frame 12. A semi-circular opening 26 can extend inwardly from a lower edge of the lower tie beam 22 for engagement with a known crank-type threaded climbing step 38 driven into a tree. A semi-circular opening 28 can extend inwardly from a lower edge of each frame rail 18 for engagement with the climbing step 38.

A frame anchor 30 including a beveled end portion for penetration into a tree can be rigidly attached to an upper portion of each frame rail 18. Each frame rails 18 can also have a hanger loop 32 through which an attachment ligature 36 can be inserted for attaching the support frame 12 to a tree. The attachment ligature 36 can be a known ligature, such as a strap, a chain, a rope, or other similar implement.

The saddle assembly 14 can be generally a hanger plate assembly, and can include a saddle 40 for supporting a hunter in a seated or almost standing position, a hanger plate 48, and a pivot arm 42 coupling the saddle 40 with the hanger plate 48. The pivot arm 42 can be an elongate member adapted for cantilevered support of the saddle 40 and hunter. The pivot arm 42 can include a cantilevered beam 70 defining a longitudinal axis 76, and can terminate at a first end in a saddle connection 44 and at a second end in a pivot pin 68. The hanger plate 48 with attached seat assembly 14 can be selectively suspended from at least one rung of the support frame 12 to accommodate hunters of differing heights with differing seating preferences.

The hanger plate 48 can have a generally planar plate-like hanger plate body 130 transitioning at a top edge to a U-shaped fold-over suspension hook 132. The suspension hook 132 can be configured to slidably receive a rung 20 therein, thereby suspending the hanger plate 48 vertically against the rungs of the support frame 12. A supplemental suspension hook 134 can be rigidly attached to the hanger plate body 130 beneath the suspension hook 132 a distance enabling the suspension hook 132 and supplemental suspension hook 134 to be concurrently hung from vertically separate rungs.

A saddle support plate 56 can be a generally plate-like body adapted for attachment to the underside of the saddle 40, such as with screws, rivets, adhesives, and the like. A pivot spindle 54 can be rigidly attached to the saddle support plate 56 to extend orthogonally away from the plate 56. The spindle 54 can be rigidly attached to the plate 56 by suitable means, such as welding, buttressing, keyed coupling, a combination of methods, and the like.

The saddle connection 44 can include a pivot bearing block 50 rigidly coupled with a first end of the cantilevered beam 70. The pivot bearing block 50 can be a cuboid or cylindrical body having a spindle opening 52 extending therethrough orthogonal to the longitudinal axis 76 of the cantilevered beam 70. The spindle opening 52 can slidably receive the pivot spindle 54. The saddle 40 can rotate about the rotation axis 58 concentric with the spindle opening 52 and pivot spindle 54.

To facilitate rotation of the saddle 40, and to minimize sound that can result from friction between the rotating pivot spindle 54 and the spindle opening 52, a low-friction annular bearing (not shown) can be seated in the spindle opening 52. The bearing can be fabricated of a low-friction material, such as Delrin®, nylon, and the like. The bearing can have an outer diameter somewhat smaller than the inner diameter of the spindle opening 52 so that the bearing can be inserted into the spindle opening 52 and frictionally retained therein.

The low-friction bearing can have an inner diameter somewhat larger than the diameter of the pivot spindle 54 so that the pivot spindle 54 can be slidably inserted into the bearing. The saddle 40 can be rotated relative to the pivot bearing block 50 with little generation of noise.

The pivot arm connection 46 can enable the cantilevered beam 70 to rotate about a rotation axis 72. The pivot arm connection 46 can include an upper pivot bearing 60 and a lower pivot bearing 62, each fabricated of a material having selected properties, such as steel, aluminum, and the like.

The upper pivot bearing 60 can be a somewhat plate-like body having a circular upper pivot recess 64 extending into the upper pivot bearing 60. The lower pivot bearing 62 can be a plate-like body having a circular lower pivot recess 66 extending into the lower pivot bearing 62. Alternatively, the pivot recesses 64, 66 can each extend through the pivot bearings 60, 62, respectively, to form through openings for receipt of the opposed elongated ends of the pivot pin 68. The pivot bearings 60, 62 can have identical configurations, or different configurations; e.g. the lower pivot bearing 62 can have a somewhat greater area relative to the upper pivot bearing 60 to enhance support of the pivot arm 42 over the range of rotating movement.

The pivot bearings 60, 62 can be rigidly attached to the hanger plate 48 with the upper and lower pivot recesses 64, 66 concentrically disposed to accommodate the cantilevered beam 70 therebetween. The pivot pin 68 can be seated in the upper and lower pivot recesses 64, 66 for rotation about the rotational axis 72. Each pivot recess 64, 66 can be lined with a low-friction bearing or sleeve (not shown) configured to accommodate the pivot pin 68 for silent rotation of the cantilevered beam 70 about the rotation axis 72. The facing surfaces of the upper and lower pivot bearings 60, 62 can also have a low-friction bearing liner (not shown) to minimize sound from rubbing movement of the cantilevered beam 70 against the pivot bearings 60, 62.

Figure 3:
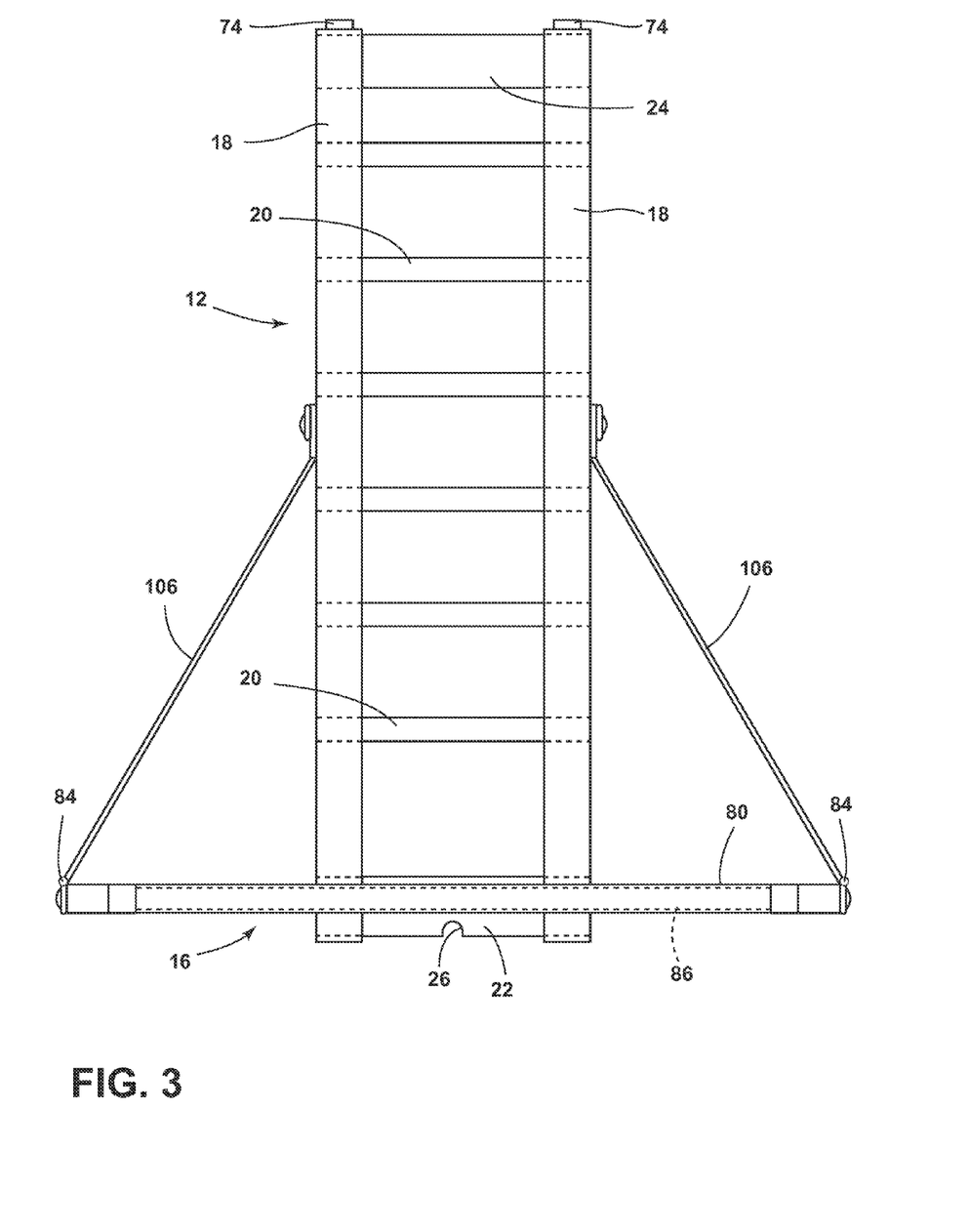
FIG. 3 is a front elevation view of the support frame and platform assembly, with the saddle assembly removed for clarity.
Figure 4:
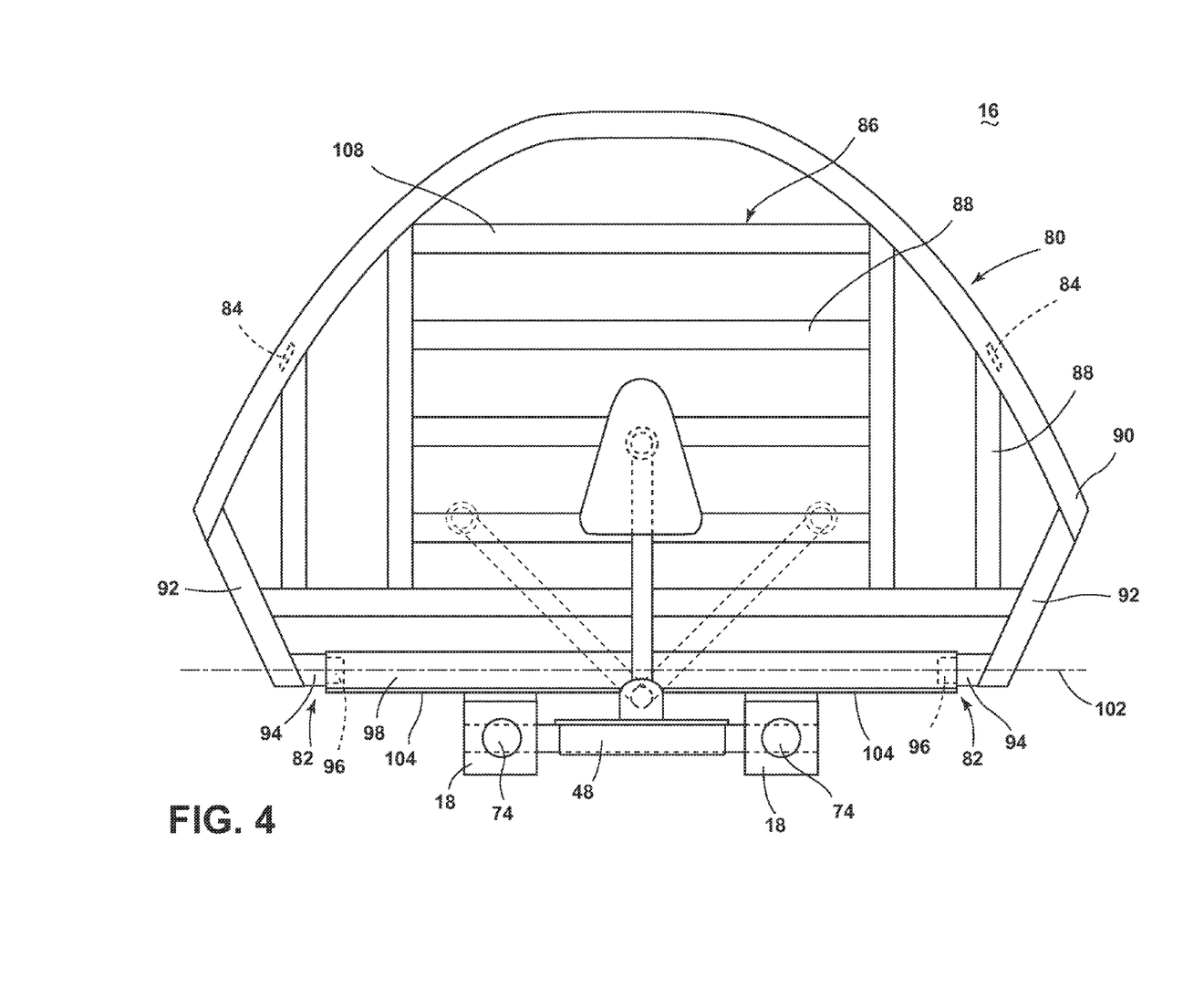
FIG. 4 is a plan view from above of the platform assembly and support frame, with the saddle assembly shown in schematic partially phantom view.

Referring to FIGS. 1, 3, and 4, the platform assembly 16 can include a platform 80 and a pivot connection 82. The platform 80 can be a somewhat semicircular-shaped open frame 86 comprising elongate frame members 88 and a perimetric member 90 defining an arcuate outer edge. The platform frame 86 can be fabricated of structural members, such as structural tubing, angle iron, I-beam members, and the like, which can be fabricated of steel, aluminum, and the like.

The frame members 88 can be rigidly coupled into a generally rectangular frame 86 having sufficient strength for supporting a hunter and equipment. The perimetric member 90 can be rigidly attached to the platform frame 86 to define the platform 80. The perimetric member 90 can terminate at each end in a pivot block 94 forming part of the pivot connection 82. It should be understood that the platform framework of FIG. 4 is merely exemplary, and can have configurations different than that illustrated. The size and configuration of the platform 80 can be adapted to the arcuate sweep of the saddle 40 and cantilevered beam 70.

Referring to FIGS. 1 and 4, each pivot connection 82 can comprise an integral pivot block 94 and pivot pin 96. Each pivot block 94 can be rigidly coupled with an end of the perimetric member 90, and each pivot pin 96 can be slidably inserted into the end of a hollow pivot beam 98. The opening at each end of the pivot beam 98 can be lined with a low-friction sleeve (not shown) to slidably receive the pivot pin 96 for silent pivoting of the platform 80 about a horizontal axis 102.

The pivot beam 98 can be an elongate hollow member having a rectangular or circular cross-section, and defining a longitudinal axis 102. The pivot beam 98 can be rigidly attached to a support member 104, such as an angle iron. The support member 104 can be rigidly coupled with the frame rails 18 so that the support member 104 and pivot beam 98 can be oriented orthogonal to the support frame 12.

Referring again to FIG. 3, the platform 80 can be stabilized relative to the support frame 12 by a pair of anti-tilt members 106. The anti-tilt members 106 can be coupled with the frame rails 18 along an outer side thereof, and also coupled with the platform 80 through a tilt coupling 84. The anti-tilt members 106 can be flexible, such as steel cable, or solid, such as steel rods. The coupling 84 can be an eyelet rigidly coupled with the perimetric member 90. A cable can be attached to the eyelet 84 in a known manner, such as with a hook, a carabiner, a ring, and the like. The flexibility of the cable can enable the platform 80 to rotate upwardly about the horizontal axis 102 without disconnecting the cable from the eyelet 84.

The rod can include a mechanism, such as a spring snap, a trigger snap, and the like, enabling disconnection of the rod from the tilt coupling 84. With the rod free of the platform 80, the platform 80 can be rotated about the horizontal axis 102.

Figure 5:
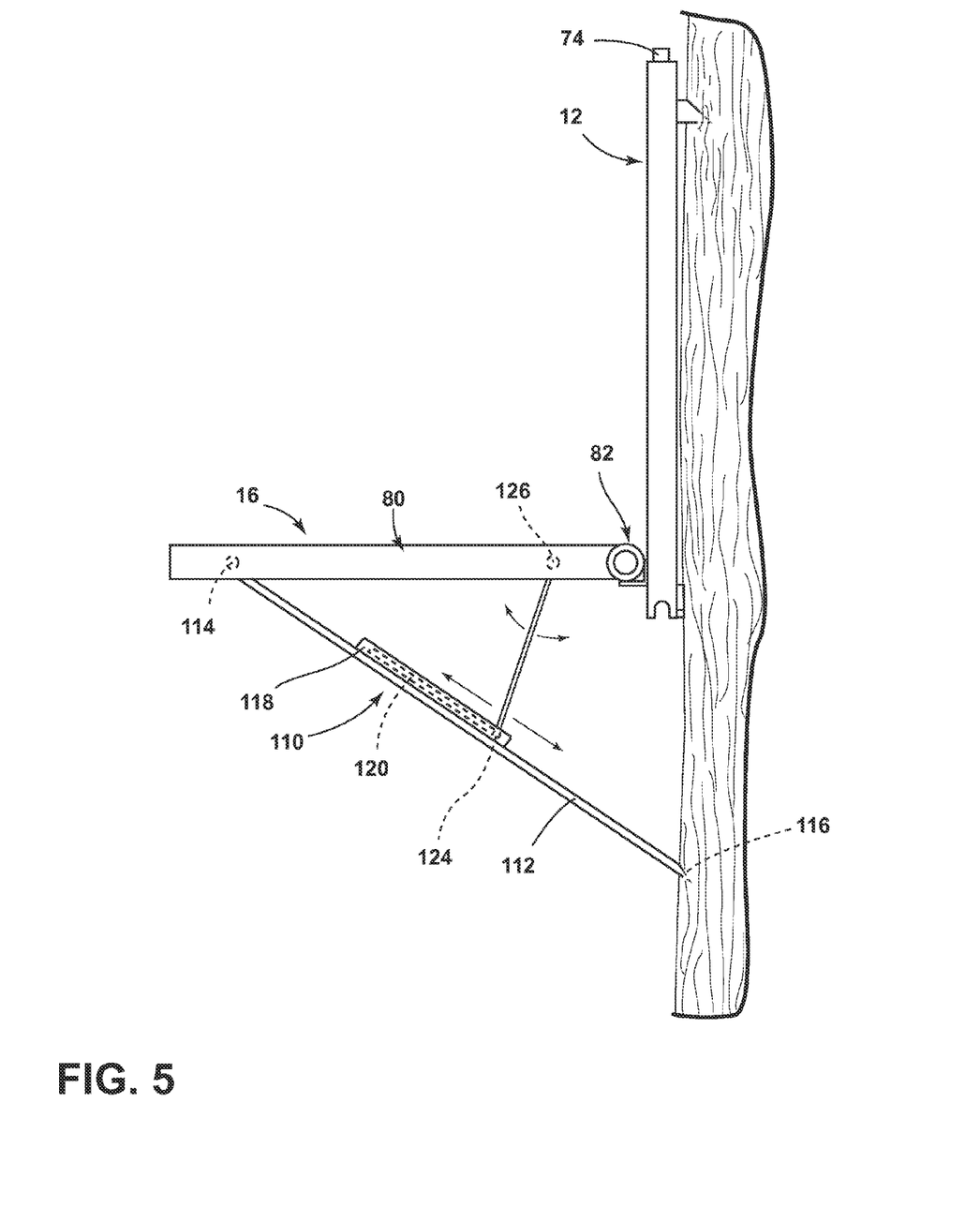
FIG. 5 is a schematic side view of the support frame and platform assembly, with an exemplary platform support assembly.

Alternatively, the platform 80 can be supported from the underside through a cantilever brace assembly 110 (FIG. 5). The brace assembly 110 can comprise an elongate compression member 112 attached at a first end to a pivot connection 114 attached at a forward portion, such as a cross-member 108 (FIG. 4), of the platform 80. The second end of the compression member 112 can terminate in a tapered end 116 for insertion into a tree to facilitate orienting the platform 80 in a horizontal position.

An elongate tension member 122 can be coupled at one end through a pivot connection 126 attached to the platform 80, and at an opposed end to the compression member 112 through a channelway pin 124. A channelway member 118 can be integrated with the compression member 112, and can have a channelway 124 accommodating the channelway pin 124 in slidable disposition. Movement of the channelway pin 124 in the channelway 120 can enable pivotal movement of the compression member 112, thus facilitating placement of the tapered end 116 and leveling of the platform 80.

Figure 6A:
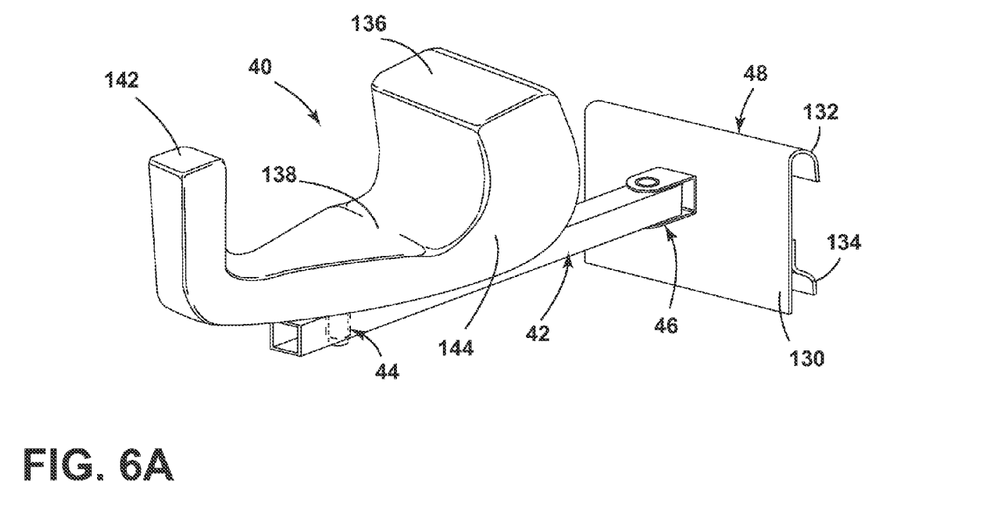
FIGS. 6A-D are perspective views of several embodiments of the hanger plate adapted for several functionalities, including a seat functionality.
Figure 6B:
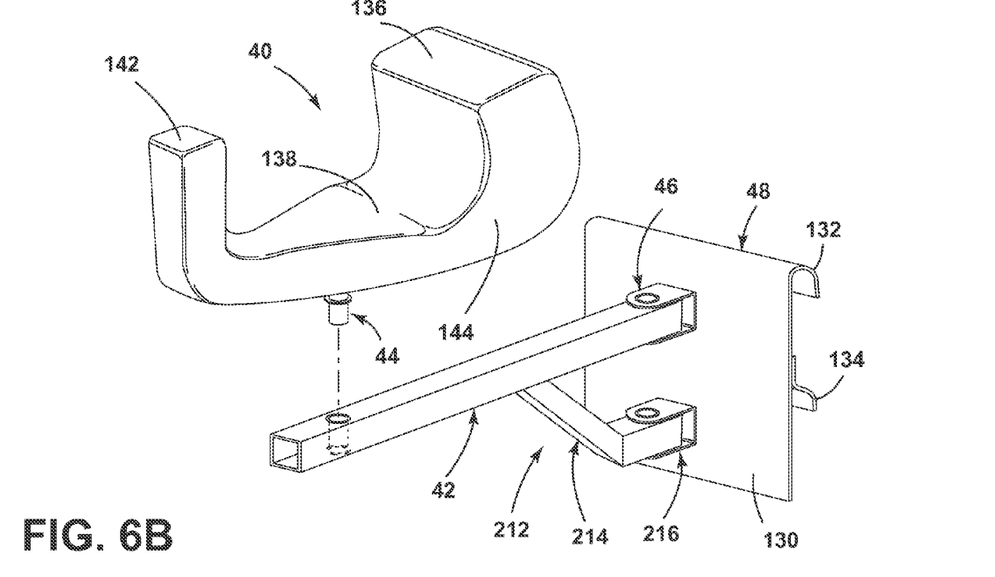

Referring to FIGS. 6A and B, the saddle 40 can have an irregularly-shaped, bilaterally symmetrical body comprising a saddle back 136 transitioning to a seat surface 138, in turn transitioning to an upwardly extending pommel 142. The saddle back 136 can have a height and width providing individualized comfort, support, and stability for individual hunters. The saddle 40 can include saddle sides 144 traversing from the top of the saddle back 136 to the top of the pommel 142. The saddle sides 144 can transition from the saddle back 136 to the pommel 142 through a gradual inward progression. The pommel 142 can be a column-like portion of the saddle 40 having a generally rectangular cross-section.

When a hunter is utilizing the saddle 40, the saddle 40 can be positioned so that the vertical movement of the hunter from a fully seated position to a standing position can be relatively minimal. The pommel 142 can provide the hunter with an enhanced degree of balance, positioning, and stability while aiming at a target. The saddle 40 and saddle connection 44 can be configured to optimize the balance of the saddle 40 relative to the pivot arm 42, thereby optimizing the rotational stability of the saddle 40 and hunter.

FIG. 6B illustrates an alternate embodiment of the saddle illustrated in FIG. 6A. The saddle 40 and pivot arm 42 can be as described with respect to FIG. 6A. The pivot arm 42 can be strengthened and stabilized through a cantilever brace assembly 212. The brace assembly 212 can comprise a compression member 214 rigidly coupled at one end to the pivot arm 42, and pivotally coupled with a pivot connection 216 essentially identical to the pivot arm connection 46. The pivot connection 216 can be coupled with the hanger plate 48. It will be apparent to a person of ordinary skill in the relevant art that the pivot axes (not shown) of the pivot arm connection 46 and the pivot connection 216 must be coextensive.

Figure 7A:
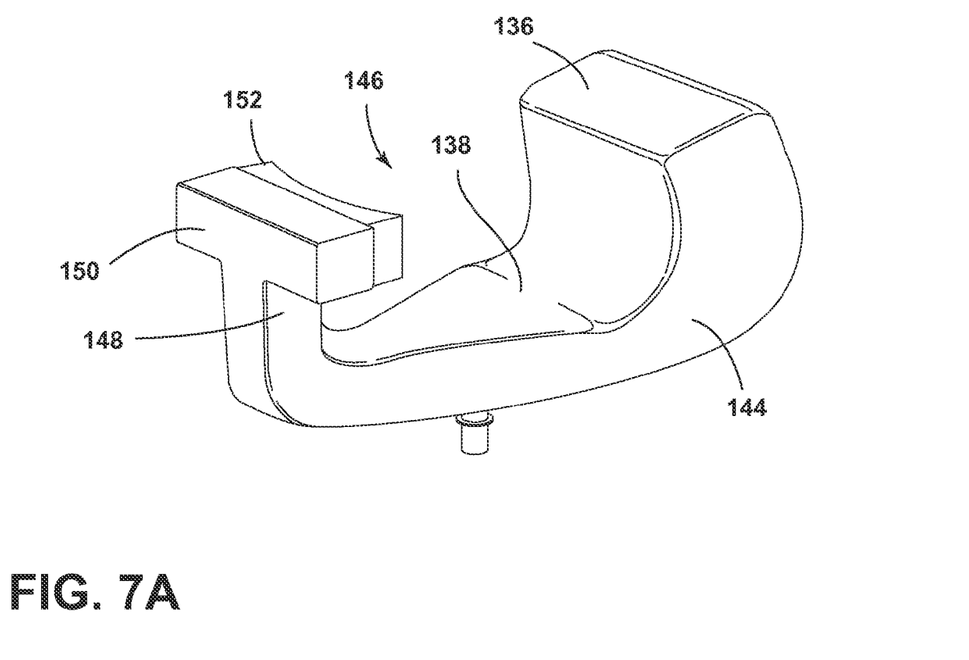
FIGS. 7A and B are perspective views of alternative embodiments of the saddle illustrated in FIGS. 6A and B.

FIG. 7A illustrates a second embodiment 146 of the saddle in which the pommel can comprise an upright portion 148 transitioning upwardly to a lateral portion 150. The lateral portion 150 can extend orthogonally outward from the upright portion 148 to provide a broad area of contact with a hunter, thereby enhancing a sense of stability and support. The lateral portion 150 can be provided with a cushion 152. Moreover, the lateral portion 150 can extend toward the saddle back 136 to enhance a hunter's comfort while contacting the lateral portion 150.

Figure 7B:
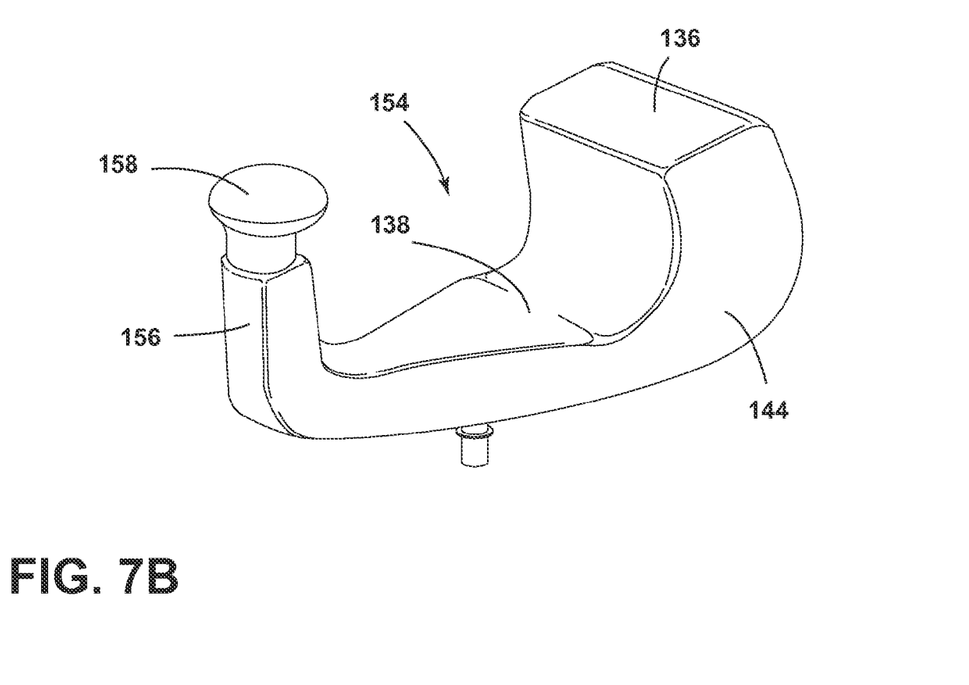

FIG. 7B illustrates a third embodiment 154 of the saddle having a pommel similar to the pommel 142, except that a lower portion 156 can terminate in a somewhat spherical pommel grip 158. All other elements of the saddle 154 can be the same as in the saddle 40.

Figure 6C:
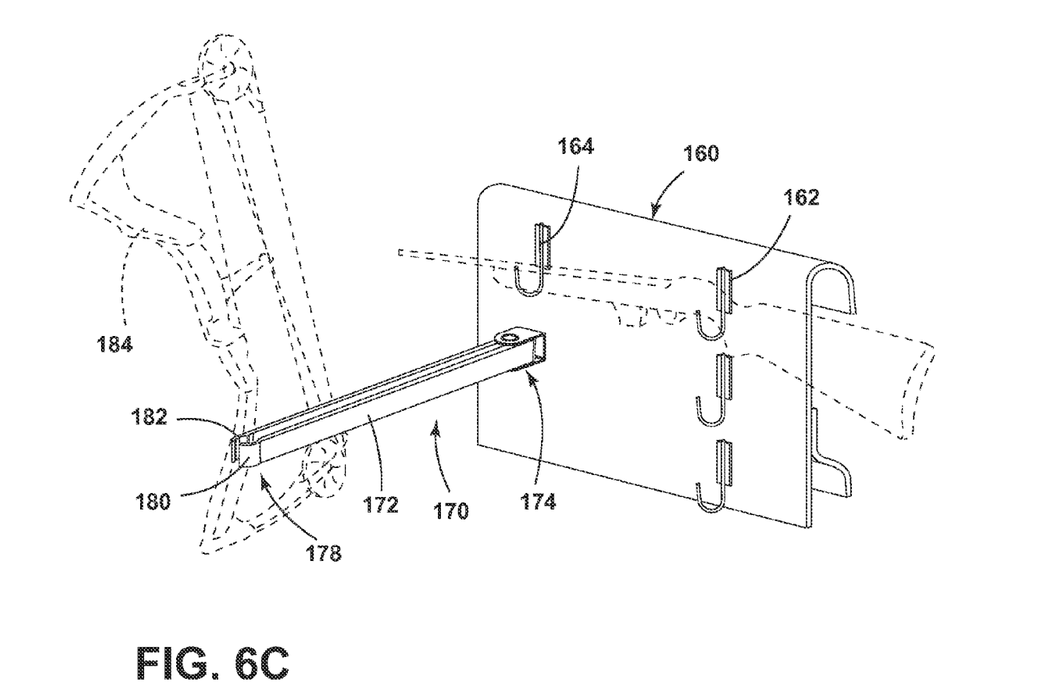

Referring to FIG. 6C, a second embodiment of a hanger plate assembly can include a multipurpose hanger plate 160. The hanger plate 160 does not support a saddle. Instead, the hanger plate 160 can include one or more hooks 162, 164 for hanging various items of use to a hunter in the field, such as clothing, food items, and the like. The hooks 162, 164 can be configured to accommodate items of different weight, shape, and use. For example, two horizontally aligned hooks 162, 164 can be configured to support a rifle.

The multipurpose hanger plate can also include a hanger arm assembly 170 comprising a hanger arm 172 connected at one end to the hanger plate 160 through a pivot connection 174. The opposite end of the hanger arm 172 can terminate in a selected functionality, such as an adjustable clamping mechanism 178 having a first gripper 180 and a second gripper 182, which can be adapted for holding an implement, such as a hunting bow 184. The hunting bow 184 can be selectively moved away from the hunter and to the hunter by pivoting the hanger arm 172. Alternatively, the hanger arm 172 can be adapted to hold items such as a still or video camera, floodlights, and the like. As with the above-described pivot connections, low-friction bearings can be utilized in the pivot connection 174.

Figure 6D:
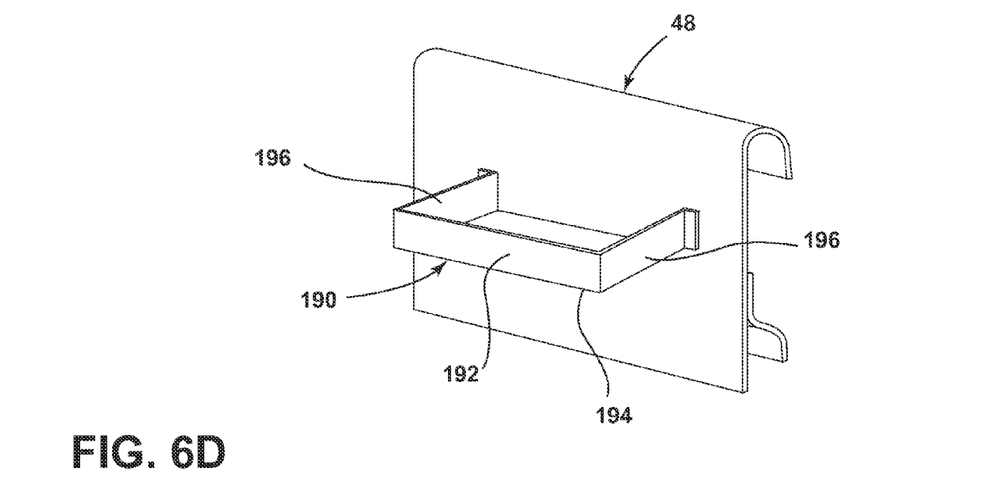

Referring to FIG. 6D, a third embodiment of a hanger plate assembly can include a hanger plate 48 rigidly coupled with a basket 190 having a front wall 192, a bottom wall 194, and a pair of parallel, spaced sidewalls 196. The basket 190 can hold items of use to a hunter, such as arrowheads, firearm cartridges, personal items, and the like.

Figure 8:
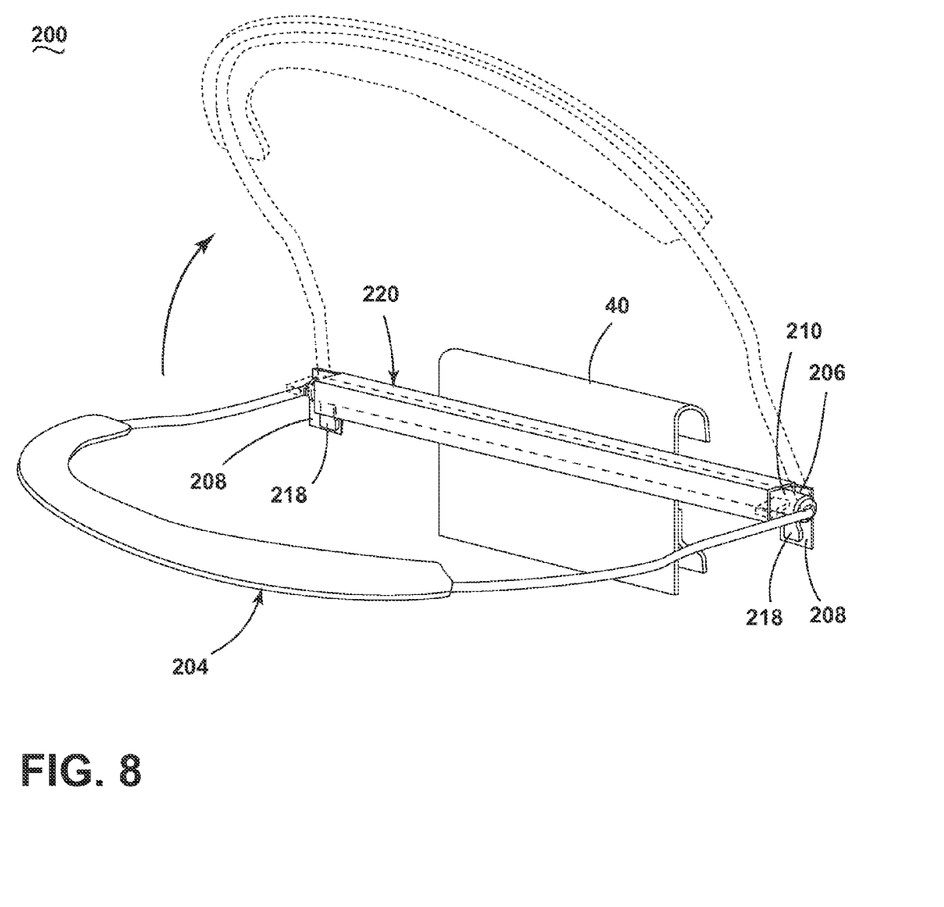
FIG. 8 is a perspective view of a gun rest assembly that can pivot from an upright position to a horizontal position, supported by a hanger plate.

Referring now to FIG. 8, a gun rest assembly 200 can comprise a pivot beam 202 to which a gun rest 204 can be pivotally attached. The pivot beam 202 can be rigidly attached to a hanger plate 40 so that the gun rest assembly 200 can be generally perpendicular to the support frame 12 when the gun rest assembly 200 can be hung on a rung 20.

The pivot beam 202 can be a hollow elongate member adapted for receipt of a pivot pin 210 integrated with a pivot block 206. The gun rest 204 can be a somewhat arcuate member having a shape complementary to the arcuate configuration of the platform 80. The gun rest 204 can be rotated to an upward position when not utilized by the hunter, and downward to a horizontal position, when the hunter is utilizing it. As with other pivot connections described herein, the pivot pin 210 can rotate within the pivot beam 202, thereby enabling rotation of the gun rest 204.

To facilitate maintaining the gun rest 204 in a selected horizontal position, the pivot block 206 can include a stop arm 218 rigidly attached thereto and extending generally laterally away from the pivot block 206. A stop flange 208 can be rigidly attached to the pivot beam 202 to extend into the circular path of the rotating stop arm 218. When the gun rest 204 can rotate from a horizontal to a vertical position, the stop arm 218 can rotate away from the stop flange 208. When the gun rest 204 can rotate downwardly to a horizontal position, the stop arm 218 can rotate into contact with the stop flange 208, thereby maintaining the gun rest 204 in a horizontal, ready position.

The tree-mountable hunting stand with modular functionality described and illustrated herein provides several advantages to a hunter. First, a ladder-like support frame can be the base module through which all other modular elements can be utilized. The support frame can be fixed to a tree, or other pole-like structure, from the bottom, through the use of known, readily-available climbing steps, and at the top through the use of a ligature tightened around the tree to draw the support frame against the tree, and through pointed frame anchors extending from the support frame that can be embedded in the tree as the ligature is tightened. The use of multiple support points, serving as a "third hand," can facilitate attachment of the support frame to the tree. In particular, the use of climbing steps provides a fixed resting stop while additional support frame attachment activities can continue.

Secondly, modularity can be achieved through the concept of a movable hanger plate adapted to support a variety of functionalities, which can be hung from one or more rungs of the support frame. For example, the hanger plate can be adapted with alternate functionalities, such as a double pivoting seat assembly, hangers, hanger arms, baskets, a pivoting gun rest, and the like. One hanger plate can provide one functionality.

The hanger plate can be vertically adjusted by simply lifting the hanger plate away from the rungs until the assembly can be moved away from the support frame. A different hanger plate with a different functionality can be coupled with the support frame by positioning the hanger plate so that downward movement will engage the suspension hooks with the rungs. In use, an outward force can act on the top suspension hook, which can be resisted by a connected rung, and an inward force acting on a lower portion of the hanger plate can be resisted by a rung in contact with the lower portion. The ability to pivot the gun rest away from a horizontal ready position to a vertical position, or to readily removed the gun rest and hanger plate from the support frame, can enable a hunter to tailor his or her hunting stand to the hunter's personal preferences.

Thirdly, a double pivoting seat assembly and curved platform can enable a hunter to rotate about a fixed point, i.e. saddle rotation, and move in a curve about the platform, thus providing the hunter with an increased field of view without compromising safety. The seat assembly can be coupled with the hanger plate to provide vertical adjustability. If the seat is not to be used, it can be readily removed from the support frame. Moreover, the incorporation of a pommel at the front of the saddle can provide the hunter with enhanced stability, balance, positioning, and comfort. The pommel can serve as an indicator of changes in positioning of the hunter, thereby enhancing safety.

Finally, pivoting of the platform about a horizontal axis enables the hunting stand to be readily disassembled and transported in a compact configuration. Various modular hanger plate assemblies can be completely removed from the support frame to be transported separately, while the support frame and platform can be compacted for storage in a relatively small area.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention, which is defined in the appended claims.

What is claimed is:

1. A hunting stand capable of being mounted to a tree, the hunting stand comprising:
   a support frame vertically attachable to the tree, the support frame comprising a vertical support member, a hollow pivot beam rigidly coupled to the vertical support member, at least one horizontal support member coupled orthogonally to the vertical support member, a frame anchor, and a ligature;
   a planar platform fixedly coupled with a pair of coaxially aligned connectors, the connectors pivotably coupled within the hollow pivot beam for rotation of the platform between a position perpendicular to the support frame and a position parallel to the support frame;
   a hanger plate comprising a rectangular planar body and an arcuate bend, the rectangular planar body transitioning along one edge of the rectangular planar body to the arcuate bend slidable over the at least one horizontal support member, the hanger plate is configured to suspend from the at least one horizontal member;
   a climbing step attachable to the tree for supporting the hunting stand on the tree;
   a saddle attached to the hanger plate, the saddle comprising a seat surface and a pommel extending upwardly from the seat surface for a hunter's abdomen to be engageable with the pommel to augment a hunters' balance while straddling the saddle, the saddle being configured to pivot about at least one of two parallel axes;
   wherein the support frame is configured to be fixedly attachable to the tree by supporting the support frame on the climbing step attached to the tree and drawing the support frame against the tree by tightening the ligature around the tree while the frame anchor is urged into the tree by tightening of the ligature; and
   whereby an elevation of the hanger plate and saddle is configured to change, without moving the support frame relative to the tree when said support frame is affixed to the tree, by moving the hanger plate from a first horizontal support member of the at least one horizontal support member to a second horizontal support member of the at least one horizontal support member by lifting the arcuate bend away from the first horizontal support member of the at least one horizontal support member and subsequently lowering the arcuate bend onto the second horizontal support member of the at least one horizontal support member.

2. The hunting stand in accordance with claim 1 wherein said support frame forms a ladder.

3. The hunting stand in accordance with claim 1 wherein a shape of the platform is arcuate.

4. The hunting stand in accordance with claim 1 wherein the platform allows for a hunter supported on the platform to move about the platform with a field of view of 360 degrees while straddling the saddle.

5. The hunting stand according to claim 1 wherein the pommel has a shape selected from the group consisting of a cylinder, a "T", and a rounded knob.

6. The hunting stand according to claim 1 wherein the hanger plate is attachable to and removable from the support frame at a selected location along the support frame in order to position the saddle at a selected height above the platform.

* * * * *